May 10, 1960   J. P. SCHRODT ET AL   2,936,327
DEFERRED ACTIVATION BATTERY
Filed Feb. 18, 1954   4 Sheets-Sheet 1
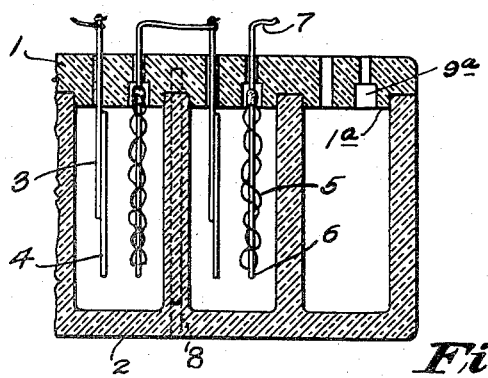
Fig.1.
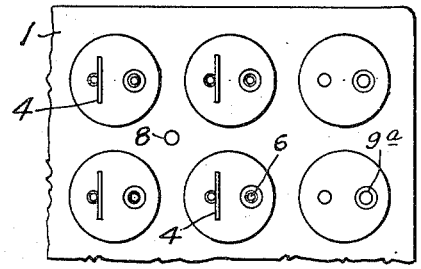
Fig.2.
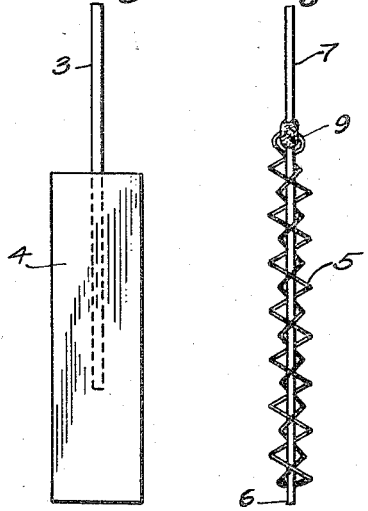
Fig.3.   Fig.4.   Fig.5.
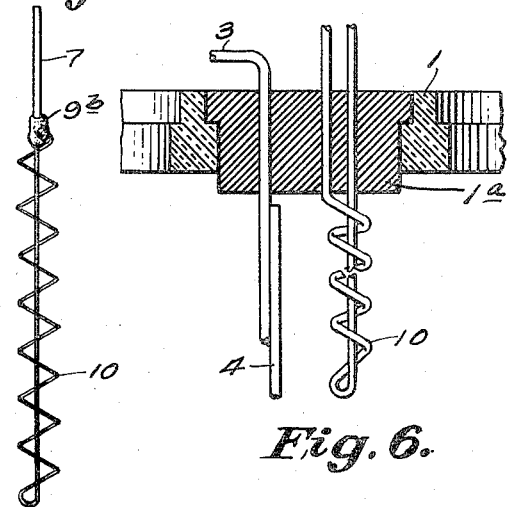
Fig.6.
Fig.14.
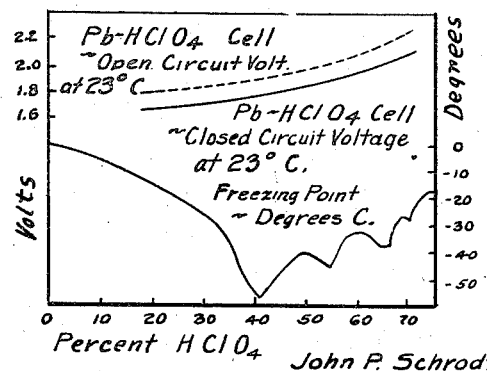
Fig.7.
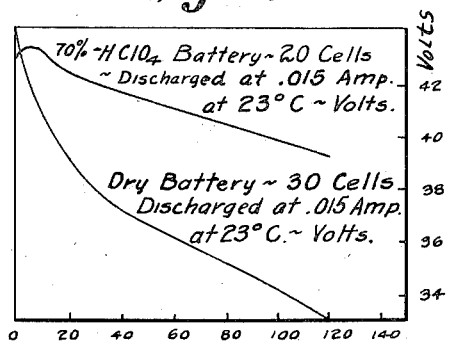
John P. Schrodt & David N. Craig,
INVENTORS
BY
ATTORNEY May 10, 1960  J. P. SCHRODT ET AL  2,936,327
DEFERRED ACTIVATION BATTERY
Filed Feb. 18, 1954  4 Sheets-Sheet 2
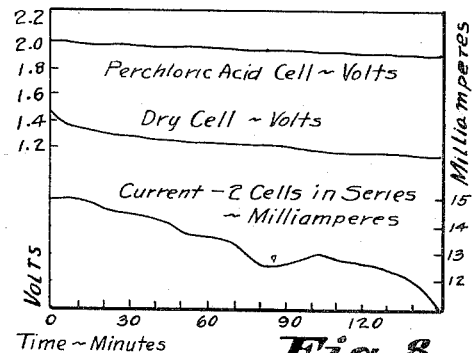
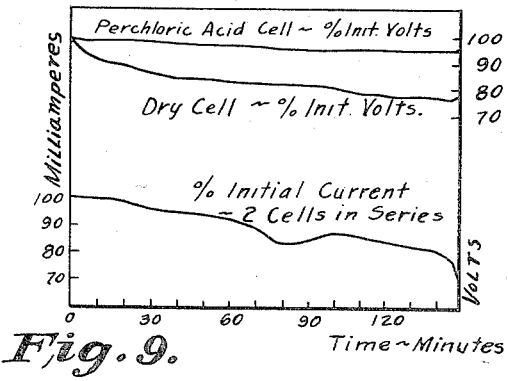
Fig. 8.   Fig. 9.
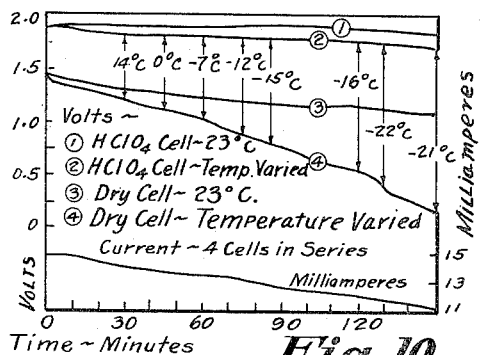
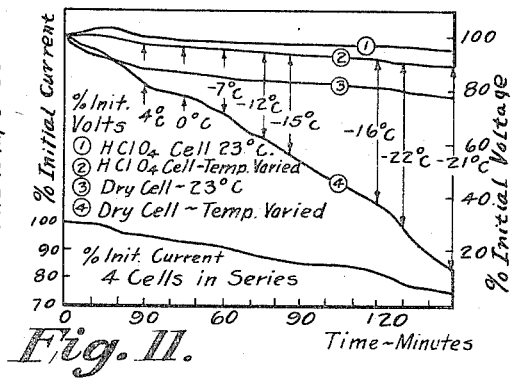
Fig. 10.   Fig. 11.
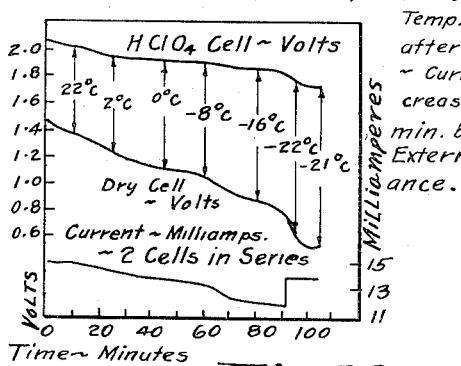
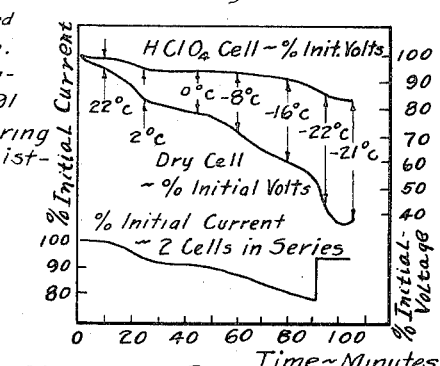
Fig. 12.   Fig. 13.
John P. Schrodt & David N. Craig, INVENTORS
BY
ATTORNEY May 10, 1960 J. P. SCHRODT ET AL 2,936,327
DEFERRED ACTIVATION BATTERY
Filed Feb. 18, 1954 4 Sheets-Sheet 3
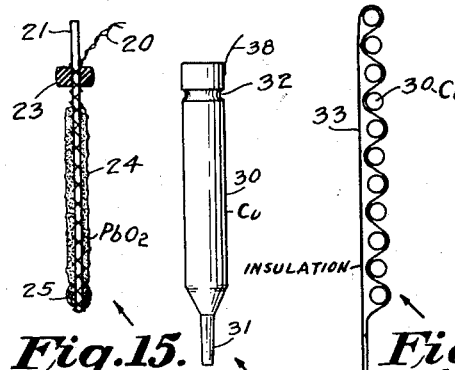
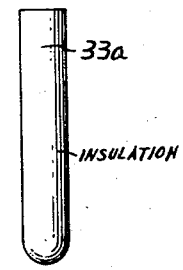
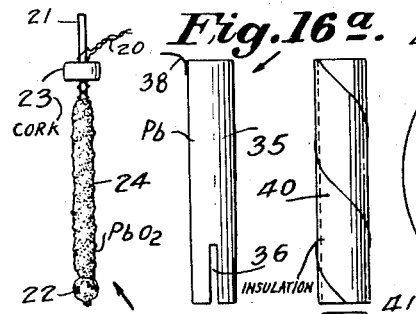
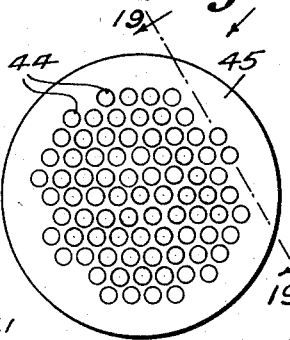
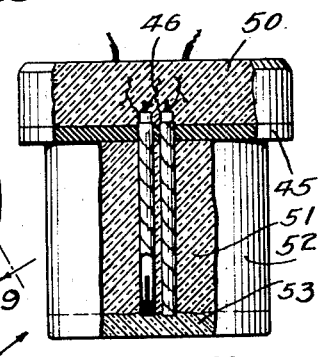
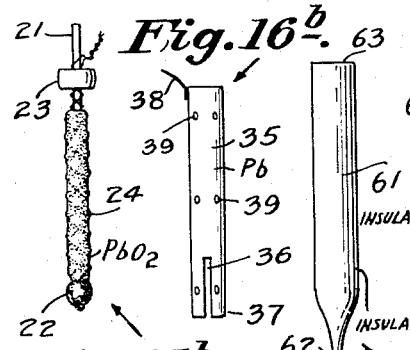
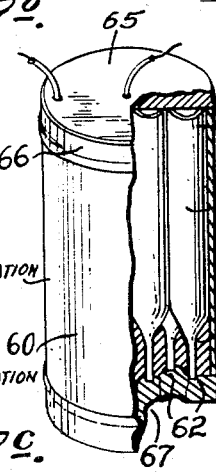
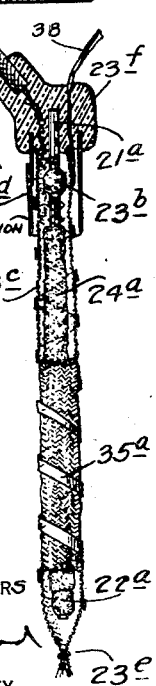
John P. Schrodt & David N. Craig,
INVENTORS
ATTORNEY May 10, 1960  J. P. SCHRODT ET AL  2,936,327
DEFERRED ACTIVATION BATTERY
Filed Feb. 18, 1954  4 Sheets-Sheet 4
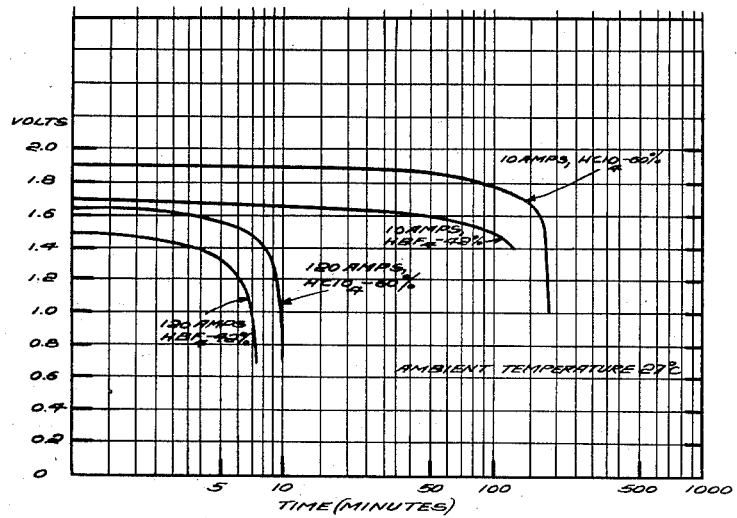
Fig. 22
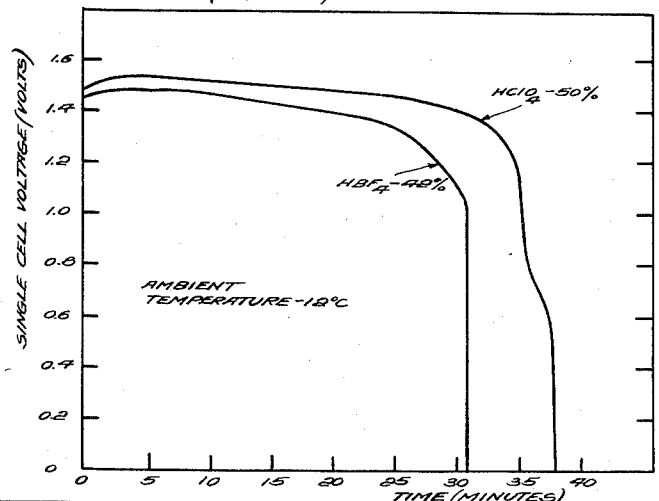
Fig. 23.
Fig. 24.
INVENTORS
JOHN P. SCHRODT,
DAVID N. CRAIG,
ATTORNEY

United States Patent Office 2,936,327
Patented May 10, 1960

2,936,327

DEFERRED ACTIVATION BATTERY

John P. Schrodt and David N. Craig, Washington, D.C., assignors to the United States of America as represented by the Secretary of Commerce Application February 18, 1954, Serial No. 411,295

17 Claims. (Cl. 136—90)

(Granted under Title 35, U.S. Code (1952), sec. 266)

The invention described herein may be manufactured and used by or for the Government of the United States for governmental purposes without the payment to us of any royalty thereon in accordance with the provisions of the act of April 30, 1928 (ch. 460, 45 Stat. L. 467), 35 U.S.C. 266.

This invention relates to the electric battery art and aims generally to improve the same. The invention resides in the provision of a new electric cell of the deferred activation type, in the construction and assembly of such cells into compact batteries, and in certain details of construction employed in the preferred embodiment thereof. Cells embodying features of the invention are particularly, but not exclusively, adapted to supply power to electronic devices such as those which are sent aloft in free balloons. The deferred activation cells of the present invention are intended principally to serve the purpose of primary cells. In the preferred embodiments the cells are formed, but unfilled, in that the active electrode materials are carried by the electrode elements but are isolated from the electrolyte until it is desired to activate the cell or battery. Thus the unfilled cell and isolated body of electrolyte constitute in their stand-by state a cell-pack immediately convertible into an active primary cell for service use. In a less preferred embodiment the cell is filled, but uncharged, in that the active material is not formed on the electrodes, and is intended to be charged by a charging current shortly prior to use.

The new cells or batteries may be stored in the dry or unactivated state without impairing their efficiency. They are readily activated and may be put into service immediately after activation. Comparative tests show that these cells have better discharge characteristics, particularly at low temperatures, than available cells of the same weight and volume.

From the following detailed description of preferred embodiments of this invention it will be apparent that it provides batteries and cells having special advantages in low temperature operation, in constancy of output, in low internal resistance, in extreme compactness, and in ability to supply flash currents even after periods of current drain; which are controllable as to potential and freezing point within a considerable range; and which embody features making for simplicity, ease and cheapness in manufacture and in putting into service, both in the preferred formed-unfilled type, and in the filled-uncharged type of battery; and for augmenting the voltage of the cells when desired.

In the accompanying drawings illustrative of preferred embodiments of the invention—

Fig. 1 is a vertical section through a battery, showing cathode supports and anodes for a plurality of cells mounted in a portion of a unitary battery cover and assembled with a reservoir unit, the cathode supports being shown without any lead-dioxide deposit thereon;

Fig. 2 shows a further modified assembly of a mutual reservoir unit removed;

Fig. 3 is a detail of the anode element of Fig. 1;

Fig. 4 is a detail of the cathode-support of Fig. 1;

Fig. 5 is a detail of a modified cathode-support;

Fig. 6 is a vertical section of a modified cover assembly of an anode and a cathode-support without deposited lead dioxide;

Fig. 7 is a chart illustrating the open and closed circuit voltages of perchloric acid cells at 23° C., and the freezing points of the electrolyte;

Figs. 8 to 14, inclusive, are charts comparing the characteristics of the new-cell with those of the ordinary $MnO_2$-zinc dry cell battery.

Figs. 15, 16, 17 and 17–a illustrate a modified form of battery, and are, respectively, elevations of a coated cathode assembly (in section) and of an anodic reservoir, and diagrammatic showings of a mode of assembling the cells into a strip insulated battery;

Fig. 18 is an elevation of a plastic insulating jacket of a type which may be employed in lieu of the strip-insulation of Figs. 17–17a;

Figs. 15–a, 16–a, 17–b, 18–a, and 19 illustrate another modified form of battery, and are, respectively, elevations of a coated cathode assembly like that of Fig. 15, a modified anode, and a modified cell jacket, a detail plan of a cell retainer, and an elevation of a battery employing said elements sectionalized to correspond to the line 19—19 of Fig. 18–a.

Figs. 15–b, 16–b, 17–c and 20 illustrate a further modified form of battery, and are, respectively, elevations of the cathode, anode, and a jacket fillable by differential pressure, and a partially sectioned perspective of an assembled battery (employing such elements); and Fig. 21 shows a further modified assembly of a mutually insulated coated cathode and anode contemplated by the invention.

Fig. 22 is a chart plotting discharge voltage on a linear scale against time on a logarithmic scale and illustrating the constant voltage characteristics of perchloric and fluoboric acid cells under 10 ampere and 120 ampere discharge rates, the ambient temperature being 27° C.

Fig. 23 is a similar chart, both scales being linear, showing how such cells maintain their voltage and constant voltage characteristics at −12° C.

Fig. 24 is a similar chart comparing the operation of perchloric acid-, fluoboric acid-, and fluosilicic acid cells.

Referring generally to cells according to the invention, the anodes of these cells comprise metals or alloys which readily form soluble perchlorates electrochemically but do not readily displace hydrogen from a solution of perchloric acid. The cathodes comprise supports having noble and/or non-corrosive metallic surfaces covered with or supporting lead dioxide. The surfaces may be of platinum, palladium, gold, etc., and or tungsten, tantalum, etc. Suitable supports made of palladium wire without the deposited lead dioxide are shown in Figs. 5 and 6. Supports with combined palladium and tungsten surfaces are shown in Figs. 1, 2, 4 and 5. The latter support is more rigid and requires a minimum of noble metal.

The lead dioxide may be deposited on these supports electrochemically in an aqueous solution containing 1500 milliliters of water, 450 grams of lead nitrate, and 75 milliliters of concentrated nitric acid (sp. gr. 1.40), as hereinafter more fully described.

The electrodes comprising anode-cathode pairs may be mounted in reservoirs fashioned in suitable material. One mode of assembly is realized by mounting the anode-cathode pairs in a removable cover (see Figs. 1, 2 and 6) designed to engage a unit containing the reservoirs (Fig. 1).

Referring to the form of the invention shown in Figs. 1 to 4, each cell, as therein shown, comprises a reservoir herein made up of a cover portion 1 and a receptacle portion 2, adapted to house the cell elements, namely, the anode 3—4, the cathode 5—6—7, and the electrolyte.

The anode lead-in and the anode-support, 3, in this embodiment are formed from a piece of copper wire and the anode 4 is in the form of a thin strip of lead soldered to the copper wire 3 (see Fig. 3). The cathode lead-in 7, of any conducting material, such as copper wire, is connected to the cathode-coating carrier made up of the wires 5 having noble metal surfaces (as platinum, palladium, gold, etc.), which in this form are carried by the central supporting wire 6, suitably formed of tungsten, tantalum, or like metal (see Fig. 4). In the form shown, the lead-in 7, central supporting wire 6 and finer twisted wires 5 are united by soldering at their junction 9, adapted to be positioned within the apertures 9-a of the cover-portions 1, and to be sealed therein by sealing compound (omitted for clarity) thereby securing the cathode and anode elements in the cover portion 1. This cover portion, as shown, is provided with cylindrical stopper members 1-a (which may be separately inserted in the cover 1, as shown in Fig. 6, or formed integral therewith as in Figs. 1 and 2) adapted to form fluid tight closures for the reservoirs in the body 2, centering pins 8 being preferably provided to guide the cover 1 into closing position on the body 2.

In the form shown in Figs. 5 and 6 the construction is the same, except that the noble-metal cathode support is formed of a single fine wire 10 surfaced with plantinum, palladium, gold, or the like, and the tugnsten or tantalum supporting wire 6, of Figs. 1 to 4, is dispensed with. In Fig. 5, the wire 10 is soldered to a cathode lead-in at 9-b, while in Fig. 6 its two ends are pushed through the rubber stopper member 1-a and may be electrically connected with the anode lead-in of the adjacent cell in any suitable manner.

Since no chemical reaction occurs prior to activation, the batteries may be stored indefinitely in the dry condition. Furthermore the reaction which gives rise to the electric current takes place at the surface of the solid electrodes and no delay is necessitated to permit the solution to permeate the active materials before starting a discharge.

The chemical reaction in these cells during discharge is given, in general, by the following:

Lead dioxide+perchloric acid+anode metal→
   perchlorate of lead+perchlorate of anode metal+water A cell having this reaction is one which in discharged condition has an electrolyte comprising an aqueous solution of at least one soluble metal salt of a non-oxidizing and non-oxidizable acid, and which, when not discharged, has an anode and cathode of the metal of said salt and its peroxide, respectively. The definition of this acid as a non-oxidizing and non-oxidizable acid of course has reference to the fact that it is one the chemical composition of which is not appreciably affected by its simple contact with the metal and metal oxide of the anode and cathode—that is, one which has no significant oxidizing or reducing action on these active materials by simple contact therewith.

In a cell with a lead anode the chemical reaction during discharge is:

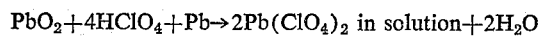
$PbO_2 + 4HClO_4 + Pb \rightarrow 2Pb(ClO_4)_2$ in solution $+ 2H_2O$ The $Pb(ClO_4)_2$ formed at each electrode during discharge is freely soluble in the aqueous perchloric-acid solution and consequently the active materials of the electrodes react readily and efficiently with the perchloric acid. The polarization and resistance of the cell are therefore small and the cell discharges at nearly constant closed-circuit voltage. Although a deficiency in the capacity of a single cell of a perchloric-acid battery in accordance with this invention causes a loss in battery voltage this loss is, however, not augmented by a large IR drop. The failure of a dry battery is, however, often caused not alone by the loss in voltage of a deficient cell but by this loss augmented by a larger IR drop arising from an excessive internal resistance of the cell.

The open-circuit voltage of these cells depends on the metal or alloy used as the anode and on the concentration of $HClO_4$ in the solution. The open-circuit voltages at 23° C. of cells with lead anodes and containing solutions of 20–70 percent $HClO_4$ are shown in Fig. 7. The closed circuit voltages were observed for cells with cathodes 1.3 cm. long and 0.3 cm. in diameter, and with lead anodes 1.3 cm. x 0.5 cm. x 0.05 cm. Each anode-cathode pair was immersed in one milliliter of the respective solutions held in cylindrical reservoir 0.9 cm. in diameter. The closed-circuit voltages were observed at the end of a two-minute discharge at 0.015 ampere.

The performance of a cell at low temperatures is limited by the freezing point of the solution used in the cell. Accordingly the freezing-point curve of aqueous perchloric-acid solutions is shown in Fig. 7. The freezing points were taken from J. W. Mellor's "Comprehensive Treatise on Inorganic and Theoretical Chemistry," 1922, volume II, page 378. The freezing points together with the closed-circuit voltage curve serve as guides in choosing the optimum perchloric-acid concentration for batteries that are expected to operate at temperatures in a specified range.

The performance of the perchloric-acid cells may best be judged by comparing their performance with that of "dry" cells of the $MnO_2$-zinc type used in radio-sonde batteries. The experimental results of a comparative test at 23° C. are shown in Fig. 8. The perchloric-acid cell contained an anode of lead foil and a cathode of $PbO_2$ which had been deposited electrochemically on a combined tungsten-palladium surface (Fig. 4). These electrodes were suspended in 1.5 milliliters of a 65 percent perchloric-acid solution contained in a hard-rubber cylindrical reservoir. Both cells were discharged in series, insuring identity of current drain. During the first 10 minutes the current was maintained at 0.015 ampere by adjusting the external resistance. During the rest of the discharge the external resistance remained fixed and the current was allowed to drift. In this test an additional dry cell and an additional perchloric-acid cell were discharged in the same circuit. The temperature of the two latter cells was lowered during the discharge and although the current was in part dependent on these two cells there is no uncertainty in the comparative results shown in Fig. 8 for the two cells at 23° C. It is to be noted in this figure that the drop in the closed-circuit voltage of the perchloric-acid cell is less than that of the dry cell. The results of this test calculated on a percentage basis, assuming the initial closed-circuit voltage of each cell to be 100 percent, are shown in Fig. 9. This figure shows that the closed-circuit voltage of the perchloric-acid cell at the end of 150 minutes was 95 percent of the initial value. The closed-circuit voltage of the dry cell declined, however, to 95 percent of its initial value in 6 minutes and to 78 percent of its initial value in 150 minutes.

In another comparative test two perchloric-acid cells containing 60 percent $HClO_4$ and two dry cells were discharged in series. The perchloric-acid cells contained electrodes as previously described (Fig. 4). The four cells were discharged at a constant current, 0.015 ampere, for the first ten minutes by adjusting the external resistance. Thereafter the external resistance remained fixed and the current was allowed to drift. Without interrupting the discharge one of the perchloric-acid cells and one of the dry cells were placed in a chamber which could be readily cooled. The results of this test and the temperature of the air surrounding the two cells in the cooled chamber are shown in Fig. 10. These curves show that the decrease in the closed-circuit voltage of each perchloric-acid cell is much less than that of the dry cell at the corresponding temperature. The relative performance on a percentage basis is shown by Fig. 11.

This figure shows that the perchloric-acid cell, which was cooled, maintained a more nearly constant voltage during the discharge than the dry cell discharged at 23° C.

Tests have also been made to compare the performance of a cell containing perchloric-acetic-acid solutions with that of a dry cell. The reaction of the acetic acid should be analogous to the reaction of perchloric acid since lead acetate is a soluble salt and furthermore acetic acid like perchloric acid neither oxidizes lead nor reduces lead dioxide. The solution used contained 63 percent perchloric acid and 2 percent acetic acid. The cells were discharged in series and during the first ten minutes of the discharge the current was held constant at 0.015 ampere and the temperature at 23° C. The temperature was then lowered and the current allowed to drift until 91 minutes had elapsed. The current was then increased to 0.014 ampere and held at that value for the remainder of the discharge. The results of this test are shown in Fig. 12, and it is seen that the drop in the closed-circuit voltage of the perchloric-acetic-acid cell is small compared to that of the dry cell. Furthermore the drop in voltage of the perchloric-acetic-acid cell when the current was increased at 91 minutes was also small as compared to the immediate and larger drop for the dry cell. The results of this test plotted on a percentage basis are shown in Fig. 13.

Discharge tests of a 20-cell perchloric-acid battery have also been made. The cathode supports were made of palladium wire (Fig. 5). A fine copper wire was soldered to each support and each soldered joint was held and sealed midway between the top and bottom of the cover (Fig. 1). The joint was thereby protected from the solution. The copper wires were then connected to a common terminal and the cover unit suspended so that all supports were completely immersed in an aqueous solution of lead nitrate and nitric acid. The lead dioxide was then deposited on the supports by electrolysis. During this time the supports were anodic and a sheet of copper served at the cathode. The current was held at 0.150 ampere, 0.0075 ampere for each support. When sufficient lead dioxide, as determined by current and time, had been deposited on the supports the electrolysis was terminated. The cover and the deposited lead dioxide were rinsed with distilled water and allowed to dry. The lead dioxide electrodes were then paired with lead-foil anodes and the electrodes connected in series. After adding 0.9 milliliter of a solution containing 70 percent $HClO_4$ to each reservoir, the cover was then fitted to the reservoir unit and the battery was discharged. The current was held at 0.015 ampere during the discharge by adjusting the external resistance. The closed-circuit voltages for a discharge of this battery and a commercial 30-cell radio-sonde battery at 23° C. are shown in Fig. 14. It is to be noted that the 20-cell perchloric-acid battery has an initial closed-circuit voltage which is only slightly lower than that of the 30-cell dry battery. After the first 6 minutes of discharge the closed-circuit voltage of the perchloric-acid battery was greater than that of the dry battery and at the end of the discharge, 120 minutes, the voltages were 40.2 and 33 volts respectively. The uniformity of the cells in the perchloric-acid battery may be judged by the data in Table 1 which gives the closed-circuit voltages of each perchloric-acid cell at the end of 3, 70 and 117 minutes of discharge.

The closed-circuit voltages of the 20-cell perchloric-acid battery (70 percent $HClO_4$) are given in Table II together with the closed-circuit voltages of two commercial 30-cell dry batteries. One of the dry batteries was made by manufacturer A and contained dry cells of the type used in all previous comparative tests. The other dry battery was made by manufacturer B and contained dry cells of a different type of construction. The batteries made by manufacturer A are at present used on radio sondes whereas those of manufacturer B have recently been submitted as competitive for this service. The three batteries were discharged at constant current, 0.015 ampere, at 23° C.

Table III gives the results expressed on a percentage basis. It is evident that the performance of the 20-cell perchloric-acid battery was definitely better than the performance of either dry battery and that the battery of manufacturer A is superior to that of manufacturer B. Attention is called to the fact that in all previous tests the perchloric-acid cells have been compared with the dry cells of manufacturer A.

Table I.—Closed-circuit voltages of single cells in a perchloric-acid (70 percent $HClO_4$) battery. Discharge at constant current, 0.015 ampere, and 23° C.

| Cell No. | Closed-circuit voltages at— | | | Cell No. | Closed-circuit voltages at— | | |
|---|---|---|---|---|---|---|---|
| | 3 min. | 70 min. | 117 min. | | 3 min. | 70 min. | 117 min. |
| | Volts | Volts | Volts | | Volts | Volts | Volts |
| 1 | 2.14 | 2.06 | 1.98 | 11 | 2.16 | 2.06 | 1.98 |
| 2 | 2.15 | 2.06 | 1.98 | 12 | 2.15 | 2.05 | 1.98 |
| 3 | 2.16 | 2.06 | 1.98 | 13 | 2.14 | 2.02 | 1.94 |
| 4 | 2.14 | 2.03 | 1.94 | 14 | 2.14 | 2.02 | 1.94 |
| 5 | 2.14 | 2.03 | 1.94 | 15 | 2.14 | 2.05 | 1.97 |
| 6 | 2.14 | 2.04 | 1.96 | 16 | 2.12 | 1.97 | 1.80 |
| 7 | 2.14 | 2.04 | 1.96 | 17 | 2.12 | 2.01 | 1.92 |
| 8 | 2.14 | 2.05 | 1.98 | 18 | 2.15 | 2.05 | 1.97 |
| 9 | 2.15 | 2.05 | 1.98 | 19 | 2.14 | 2.04 | 1.97 |
| 10 | 2.16 | 2.05 | 1.98 | 20 | 2.16 | 2.06 | 2.00 |

Table II.—Closed-circuit voltages; a 20-cell perchloric-acid battery (70 percent $HClO_4$); a 30-cell radio-sonde dry battery, manufacturer A; and a 30-cell dry battery, manufacturer B. Discharge at constant current, 0.015 ampere, and 23° C.

| Time of discharge, min. | Closed-Circuit Voltages | | |
|---|---|---|---|
| | 20-cell perchloric acid battery, volts | 30-cell dry battery m'f'r. A, volts | 30-cell dry battery m'f'r. B, volts |
| 0 | 42.9 | 43.8 | 43.70 |
| 15 | 42.6 | 39.8 | 38.70 |
| 30 | 41.8 | 37.9 | 36.20 |
| 45 | 41.4 | 36.9 | 34.40 |
| 60 | 41.1 | 36.2 | 33.10 |
| 75 | 40.4 | 35.4 | 31.30 |
| 90 | 40.2 | 34.8 | 29.26 |
| 105 | 39.8 | 33.8 | 27.30 |
| 120 | 39.3 | 33.0 | 25.70 |

Table III.—Discharge of a 20-cell perchloric-acid battery (70 percent $HClO_4$); a 30-cell radio-sonde dry battery, manufacturer A; and a 30-cell dry battery, manufacturer B. (The percentages were calculated from the values given in Table II.)

| Time of Discharge, minutes | Percent Initial Closed-Circuit Voltage | | |
|---|---|---|---|
| | 20-cell Perchloric-acid battery, percent | 30-cell dry battery manufacturer A, percent | 30-cell dry battery manufacturer B, percent |
| 0 | 100 | 100 | 100 |
| 15 | 99 | 91 | 89 |
| 30 | 97 | 87 | 83 |
| 45 | 96 | 84 | 79 |
| 60 | 96 | 83 | 76 |
| 75 | 94 | 81 | 72 |
| 90 | 94 | 79 | 67 |
| 105 | 93 | 77 | 62 |
| 120 | 91 | 75 | 59 |

Cells according to this invention may be embodied in many other forms some of which are shown herein by way of example. Thus, in the form shown in Fig. 15, the cathodes, which comprise, as in Figs. 1–5, supports 20 of non-corrosive metals covered with lead dioxide 24, may be formed of or coated with non-corrosive metals including platinum, palladium, gold, tungsten and tantalum or a combination of these. To avoid undue use of the more expensive metals, fine wires, say of No. 34 to No. 38, B & S gage, which may be rolled into ribbons if desired, may be wound directly against a supporting wire of tungsten or tantalum, as shown in Fig. 15, an arrangement having some advantage over that shown in Figs. 1–6, as it facilitates manufacture in quantity. In this form the fine palladium or platinum wires 20 may be wound on stiff wires 21 of the tungsten or tantalum, say of No. 24 B & S gage, two strands being preferably wound in opposite directions and quite tightly, as shown in Fig. 15. Globules of plastic 22, preferably polystyrene, may then be placed at intervals to secure the palladium or platinum wires 20 to the wire 21, and the individual electrodes may then be cut off to the proper length, the wires 21 being unwound for a short length at the ends opposite the globules 22, and twisted together as shown in Fig. 15 to form cathode leads. The globules 22 then serve not only to secure the wires 20 against untwisting but also to center the cathodes in the cylindrical anodes or jackets as hereinafter described, and to insulate the cathodes from the anodes.

In the form shown in section in Fig. 15, and in elevation in Figs. 15a and 15b, with the coating deposited thereon, the upper end of each central electrode is passed through a small stopper 23 which serves to insulate the electrode and close the cell. "Koroseal" of grade 116 or 117, having a thickness of $\frac{1}{16}$ inch, has been found better than rubber for this purpose.

The electrodes are completed for service as a deferred activation battery by electrodeposition of the active material 24, $PbO_2$, as described briefly above, and in more detail hereinafter.

Other types of inert supports for the active material 24 may be employed. For example, gold may be plated on copper, but it is necessary that the gold be impervious and have a roughened surface as when it comes from the plating bath. Burnished gold is not satisfactory because the $PbO_2$ deposit does not adhere well to it, and commercial 10 to 14 karat gold-filled wire is not chemically inert. The best and least expensive electrodes at present are those made with palladium wire wound on tungsten or tantalum wire. The invention also contemplates the use of gold-plated tantalum wire which does not require an impervious coating. It is sufficient in this case that the gold be enough to nullify the rectifying properties of the tantalum. To provide a suitable surface to hold the $PbO_2$ gold-plated tantalum wires of small sizes may be braided.

If the electrodes are to be used in the filled and uncharged type of battery, which must be charged before use, the electrodes are mounted without being formed with the coating 24. On the other hand, electrodes which are to be used in the charged and unfilled type of reserve battery are formed electrolytically before the cells are assembled. That is, the $PbO_2$ is deposited on the electrodes as shown in Figs. 15 and 15–a.

Formation of the electrodes is preferably accomplished electrolytically in an aqueous solution containing 1500 milliliters of water, 450 grams of lead nitrate and 75 grams of concentrated nitric acid as above mentioned. Large numbers of these electrodes (several hundred) can be formed simultaneously at an impressed voltage of 1.8 volts, the current being 5 milliamperes per electrode for several hours. The amount of lead dioxide deposited has some effect on the subsequent operation of the cells aside from the obvious increase in capacity which varies proportionately with the amount of the lead dioxide. More lead dioxide on the central electrode decreases the electroyltic resistance and increases the flash currents to 5 amperes or more at room temperature even for individual cells that are very small.

The anodes of these cells, as above noted, comprise metals or alloys which readily form soluble perchlorates electrochemically, but which do not readily dispace hydrogen from a solution of perchloric acid. For the present purpose lead is employed. Lead may be used directly or lead may be deposited electrochemically on some other metal, such as copper. In the filled and uncharged type, lead is deposited on copper when the battery is prepared for service, but in the charged unfilled type tubes of lead are employed.

Thus in the form shown in Fig. 16 the anode may be formed in a copper tube 30, drawn to a capillary 31 at its lower end through which the finished cell can be evacuated and filled with solution. When this has been done the cell may be closed by pinching the end of the capillary 31. As shown in Fig. 16 the upper part of the copper tube is preferably constricted as at 32, Fig. 16, to provide a seat for the Koroseal stopper (23, Fig. 15) and the upper edge of the copper tube may then be crimped over the stopper if desired. The copper is not attacked by the perchloric acid provided the cell is hermetically sealed. This makes a rugged type of cell.

Cells according to Figs. 15 and 16 may be constructed uncoated and made ready for service by charging. The charging current deposits lead dioxide 24 on the palladium wire and simultaneously deposits lead on the inner surface of the copper tube 30. The electrolyte in this case necessarily contains some lead perchlorate but since it contains from about 20% to about 70% perchloric acid, and preferably an acid content near the middle of this range, this restricts the amount of lead perchlorate that can be carried in the solution; limits the amount of lead and lead dioxide that can be deposited in the charge; provides a large stoichiometric excess of acid relative to the active ingredients depositable on the electrodes, thus insuring quite constant voltage during the discharge life of the cell; and prevents detrimental treeing of the lead during charging of the cell. These batteries, as elsewhere mentioned herein, should be placed in service shortly after being charged as the lead is gradually dissolved from the copper by local action although a reasonable coating will last a day or more. The term "some lead perchlorate" is employed above since the filled-uncharged type of cell is particularly adapted to quickly receive a small charge and deliver it, after an interval of time, as a relatively large flash current of short duration. Thus this form of perchoric-acid cell is capable of performing the same function in flash current operating circuits as a condenser, and of holding its charge for a considerably longer period. For this purpose the amount of lead perchlorate employed is very small and not critical. Thus a cell according to Figs. 15 and 16 containing 1.5 milliliters of 50% $HClO_4$ and "some" lead perchlorate, as may be shown by calculation, needs to contain only about 3 milligrams of lead perchlorate to adapt it to charging for about two minutes at a 5 milliampere rate, enabling it to produce flash currents as high as 5 amperes for a fraction of a second. As 3 milligrams of salt in 1.5 milliliters (1.95 grams) of electrolyte amounts to a concentration of but a small fraction of 1%, it is clear that the exact amount of salt included in the electrolyte for this purpose is noncritical. A suitable mode of assembly of these cells is shown in Figs. 17 and 17a, in which strip insulation 33 of varnished cambric, say, is employed to separate the several cells 30, in the manner shown. Alternatively, each cell may be assembled in a plastic insulating jacket 33a which, as shown in Fig. 18, may be shaped like a small test tube.

Cells in batteries of the charged unfilled type are preferably provided with lead anodes of the types shown in Figs. 16, 16–a, 16–b, or 21. These may me lead pipettes or tubes or lead spirals.

Thus, in the forms of battery shown in Figs. 19 and 20 anodes of lead tubing (Figs. 16–a and 16–b) are employed, and in the form of cell shown in Fig. 21, a lead spiral anode is used.

Referring to the battery shown in Fig. 19, the cathode (Fig. 15-a) preferably has the coating 24 preformed on the cathode-support 20—23, which may be identical with that of Fig. 15. The anode (Fig. 16-a) of lead tubing 35 may be quite thin, and may be provided with one or more slots 36 at its lower end. On insertion of the cathode assembly (Fig. 15-a) into the anode 35, the stopper 23 may fit into the top end of the tube 35, and the lower end 37 may be squeezed into contact with the polystyrene droplet 22 as shown in Fig. 19, to hold the parts in fixed relation, with the droplet 22 and stopper 23 acting as centering and insulating elements. As the slots 36 will be made long enough to extend past droplet 22 they will insure a path for flow of liquids in filling the cell through the slotted end. In the form of Fig. 19, the several cells are provided with insulating reservoir-forming jackets 40 (Fig. 17-b), sections of paraffined paper soda-straws being suitable for the purpose, and are provided with end-closure members 41. In assembling the cells, the jacket members 40 are slipped onto the cathode-anode assemblies, not quite reaching their tops and extending a short distance below their bottoms. The resulting assemblies may then be inserted, lead-in end first, through apertures 44 in a mounting plate or retainer 45 (Fig. 18-a), and after connection of the cells in battery arrangement, as at 46 the upper, connected, ends of the cells may be embedded in ceresin wax or other suitable insulating material 50. Any suitable mold may be employed for this purpose, or a strip of paper or cellulose tape 47 (so-called "Scotch tape" is satisfactory) may be secured around the retainer 45 to form an upstanding wall within which the melted wax may be poured. In the preferred assembly shown, the paper jackets 40 are securely gripped between the anode members 35 and the mounting plate 45.

The assembly may now be inverted, and at this stage it is preferred to mold ceresin wax or the like 51 between the jackets nearly up to the open mouths thereof, "Scotch tape" or any other suitable mold-form 52 being used in this connection.

The dry units thus formed may then be stored, care being taken to protect the open bottom ends of the cells, and when it is desired to activate the cells it is merely necessary to turn the open ends of the cells uppermost, fill them with electrolyte from a suitable source as by a pipette, letting the electrolyte flow in by gravity to displace the air in the cells by way of the slots 36, and then insert the corks 41 (preferably of "Koroseal") to close the cells. It is then desirable to add a final sealing layer of ceresin wax or the like, as at 53.

In the form shown in Fig. 20, an open ended cylinder 60 of suitable material (glass, plastic, paper, for example) is stood upright on a smooth surface. A plurality of jackets 61 of glass, plastic or other suitable material having capillary filling openings 62 and open butt ends 63 (Fig. 17-c) are then inserted butt-end first into the cylinder 60 so that their butt ends 63 lie against the smooth surface. Ceresin wax 64 may then be poured into the cylinder 60 to surround the jackets 61, flush up to their butt ends, with their capillary ends projecting from the other end of the resulting unit.

The cathodes 20—24 (Fig. 15-a or Fig. 15-b) may then be assembled with the anodes (Fig. 16-b), inserted in the respective pipettes from their butt-ends 63, and connected electrically in battery arrangement, by means of the lead-ins 20 and 38. If the cathodes of Fig. 15-b are employed, the corks 23-a will abut against the ends of the anodes, which may be clamped to the insulator 22 at their lower ends 37, but will not enter the anodes, and instead will be fitted tightly inside the butt ends 63 of the pipettes (Fig. 17-c), with the anode lead-in 38 clamped between the "Koroseal" and the pipette-wall. This arrangement is preferred to the use of corks 23 (Fig. 15-a) fitting inside the anodes, as it facilitates the application of a layer 65 of insulating wax, as ceresin, which may be flowed over the butt ends and inter-cell connections in any suitable manner, as within the "Scotch tape" wall 66.

The assembled units (Fig. 20) may now be laid aside, and when it is desired to fill them may be placed with the capillary ends 62 (Fig. 17-c) immersed in electrolyte in a pressure changing chamber. If a vacuum is then applied the air within the cells will expand outwardly through the pipettes, and on release of the vacuum, the electrolyte will flow into the cells to replace the air. In this way the electrolyte may be transferred, from the container in which it has previously been held isolated from the cell electrodes, into the several cells simultaneously; and while the several cells of the battery will be short-circuited through the entering electrolyte during the short interval of introduction, the paths through the capillary columns are attenuated and the filling of the cells is rapidly accomplished so that no detrimental discharge takes place prior to breaking of the short-circuiting electrolyte paths, as by inversion of the filled battery. Only the capillary tips of the cells need be immersed in the electrolyte when evacuating. The battery (Fig. 20) may then be inverted and sealed by wax layer 67 poured over the openings to make a solid block. The slots 36 in the anodes (Fig. 16-b) insure the necessary communication for filling and perforations 39 may also be provided to insure against trapping of air in any part of the assembled cell. As above mentioned, since the electrochemical reaction which gives rise to the electric current takes place at the surface of the solid electrodes and produces soluble products, the batteries of this invention become fully activated instantaneously on the introduction of the electrolyte into the cells. No delay is necessitated to permit a solution to permeate the active materials of the battery before starting a discharge as is required in the deferred action types of Leclanché and dry storage cells.

Referring now to the modification shown in Fig. 21, the coated cathode element, as before, comprises fine wires wound on a central support 21a. In this instance the cork 23 is dispensed with, and the fine wires are prevented from unwrapping by two gobs of plastic cement 22-a and 23-b. The anode in this embodiment is in the form of a lead strip 35-a, and is separated from the cathode by a sleeve of suitable pervious material such as braided glass-fibre 23-c over which the anode 35-a is spirally wound. Means are preferably provided to prevent unravelling of the braided glass fibre sleeve, herein shown as an insulating sleeve 23-d at the upper end (which may be a section of soda-straw) and a thread-tie 23-e at the lower end. In lieu of these means plastic coatings may be applied to prevent unravelling of the ends of the separater 23-c, or the sleeve 23-d may be the butt-end of a plastic jacket such as that shown in Fig. 18, which may be provided with a pin-hole at its bottom end to correspond with the capillary filling openings 62 in Fig. 17-c. The butt-end of the unit, at 23-d may be sealed in any suitable manner, of which the molded plastic seal 23-f is representative. A battery constructed of such units, with plastic jackets having capillary filling openings, may of course be sealed by applying a solvent for the plastic, or a plastic cement, to the capillary opening after the filling operation.

As above mentioned the invention is not limited to the use of lead as the anode metal. For example, in batteries for energizing a lamp carried by a free balloon, to be released at night to indicate by its drift the direction and velocity of upper air wind currents, i.e., in pilot balloons where the battery is subject to a relatively heavy current drain for a period of time in the neighborhood of ½ to ¾ hour, it may be desirable to energize the light at a super-normal voltage at all times. This may be accomplished in accordance with this invention by the use of an anode consisting of two metals, for example, lead enclosing a more active metal such as magnesium, aluminum and the like. A magnesium strip enclosed in a thin sheath of lead is suitable. With this arrangement after current drain for a number of minutes, say 20, has somewhat reduced the electrolyte concentration, and hence the voltage (see Fig. 7) the corrosion of the lead of the anode will commence to expose small areas of the more active magnesium, resulting in an increase in the cell voltage. Even though some gassing may result from the activity of the magnesium, this is not detrimental in the service described, where the remaining useful life of the battery at most amounts to a few minutes, and it is not expected to recover it.

It is further apparent from the foregoing that in the forms of cathode, shown in Figs. 1–4, 15 and 21, the cathode current will be carried to the lead-in elements by the noble-metal elements, 5 and 20, while the central stiffening members 6 and 21, will carry practically no current in the case of tantalum because of the formation of a high resistance blocking film presumably of tantalum oxide. Thus in these embodiments the rods 6 and 21 act purely as mechanical supports, and may therefore be made material inert in service in service as a cathode support, for example, of cellulose acetate or other inert plastic material.

As above mentioned, the present invention is preferably embodied in the formed-unfilled type of cell in which the electrolyte is suitably retained isolated from the active material of the electrodes, and is adapted to be brought into electrochemical association therewith only just prior to the putting of the cells into service. Alternatively, but less preferably, the deferment of activation may be practiced in the hermetically sealed filled-but-uncharged type of cell. In this form the hermetic sealing, as above noted, is essential to prolonged shelf life and prevents attack of the electrode supports by the sealed-in acid, which will occur if the cell is left open to the atmosphere.

In both forms of cell the activation as above indicated must be effected only a short interval before the cells are put into service, since the shelf life of the cells after activation is relatively short.

As above noted, the present invention in both forms provides for control of the relative quantities of lead, lead dioxide and acid electrolyte incorporated in the cell, to control the capacity or voltage characteristic of the device during its active service life. Thus, as above mentioned, increase of the amount of lead dioxide on the central electrode increases the capacity of the battery. Conversely, inclusion of a stoichiometric excess of acid electrolyte, relative to the amount of active ingredients deposited on the electrodes to provide the desired service life, enables the discharge potential of the cells to be maintained substantially constant, as shown in Figs. 8 through 11.

It is apparent from the foregoing that in the preferred formed-unfilled embodiments of the invention employing performed electrodes, the use of a strip-lead anode reduces local action as compared to the filled-uncharged type of cell in which the lead is laid down on a copper shell during the activation of the cell. The forming of the $PbO_2$ on the central electrode and of the lead on the outer electrode as disclosed herein, is also deemed of particular advantage in the cylindrical plate form of the perchloric acid cell, since this contributes greatly to reduction in weight of the cell and also reduces current density at the lead electrode, as is very desirable at high rates of discharge and low temperatures.

It is further apparent that the preferred formed-unfilled type of cell permits of closer spacing of the electrodes and reduction of size and weight of cell as compared to the filled-uncharged type, since difficulties due to treeing, gassing and stratification of the electrolyte, occurring during any extended charging and discharging of the filled but uncharged type of cell, are obviated.

As above indicated, while a perchloric acid electrolyte is preferred and gives the best results, other acids producing soluble lead salts and which neither oxidize lead nor reduce lead dioxide may be employed. Thus, the performance of perchloric acid cells, above considered, is closely approached by cells containing either fluoboric- or fluosilicic-acid solutions, and the latter also have other advantages under certain conditions of use. In general, the difference in the performance of the cells containing each of these three acids is more pronounced at high rates of discharge and under low temperatures of operation. So many factors are involved in evaluating the watt-hour capacity per unit of weight of the cells that it is difficult to express the relative performance quantitatively in an over-all manner.

It is recognized that perchloric acid solutions, even though they are never used at concentrations exceeding 70%, are considered to be potentially hazardous. This is particularly true if activated cells reach the hands of the general public since this acid, particularly in the presence of organic matter, decomposes at elevated temperatures with explosive violence. Consequently, for some applications it is desirable to use electrolytes of fluoboric-acid or other non-oxidizing and non-oxidized acid solutions, even though there is some loss in watt-hour capacity of the cells. Such fluoboric- and fluosilicic-acid cells will now be described.

As in the case of perchloric acid cells there are among the factors distinguishing all the cells of this invention: first, the fact that in addition to containing an amount of acid stoichiometrically equivalent to the amount of lead available for reaction, the electrolyte contains additional acid amounting to at least several times the stoichiometric equivalency of the lead, which excess acid does not enter into the electrochemical reaction, but serves to make the cell operate always at the acid end of the salt-acid reaction curve; second, that by controlling the concentration of the excess acid in the aqueous solution constituting the electrolyte, the cells are rendered effective for extreme low temperature operation.

As shown in Fig. 7, the perchloric-acid cell at an acid concentration of 41% had a freezing point of about −55° C., i.e., about −67° F., the freezing point being a rather discontinuous function of the concentration. By contrast the fluoboric-acid cell has its lowest freezing point at a cencentration of about 42% acid, this freezing point being at about −67.5° C., i.e., about −90° F. Thus, the fluoboric-acid cell has definite advantages for extreme low temperature operation.

And since with these cells also the electrolyte is essentially always an acid that does not itself oxidize lead and is not itself oxidized by lead dioxide, and in which the electrochemical reaction product or salt is freely soluble, the several fold excess of acid as compared with the lead available for electrochemical reaction is important because it maintains the acid concentration of the cell substantially constant during its discharge, and thus stabilizes the voltage throughout substantially the entire useful life of the cell, a matter of great utility in the powering of electronic circuits and the like. Furthermore, since cells of this type, with such acid content, have low internal resistance whether charged or discharged, such cells are able still to yield high amperage flash currents after periods of operation corresponding to substantial parts of their useful lives.

In this connection, Fig. 22 compares the operation of a cell comprising a large stoichiometric excess of perchloric-acid of 60% concentration (freezing point about −30° C., i.e., −22° F., per Fig. 7) with a cell comprising a large stoichiometric excess of fluoboric acid of 42% concentration (freezing point about −67.5° C., i.e., −90° F.) and shows that even though the fluoboric-acid cell has a much lower freezing point and a terminal voltage only a little below that of the perchloric-acid cell still it exhibits the same highly useful constant voltage characteristic over practically its entire discharge capacity range, even at the 10 ampere and 120 ampere discharge rates on which Fig. 22 is based, at an ambient temperature of 27° C.

The maintenance of substantially full voltage throughout the entire life of the cell even at the low temperature of —12° C., is illustrated in Fig. 23, from which it may be observed that the sudden drop of voltage at the end of the discharge cycle corresponds to the exhaustion of the supply of active material on one of the cell electrodes acting as a limiting electrode.

The same principle of employing a large excess of acid so that the cell operates essentially as an acid cell rather than at the salt end of a salt-acid curve, is also applicable to other cells of the type concerned, as exemplified in Fig. 24. As there shown, a 30% concentration fluosilicic-acid cell produces a voltage between those produced by a 50% perchloric-acid cell and a 42% fluoboric-acid cell, although it is not as advantageous as the perchloric-acid cell for low temperature work or the fluoboric-acid cell for extreme low temperature work.

It is further apparent that the invention is not limited to the particular embodiments disclosed.

This application is a continuation in part of our copending application Serial No. 424,160, filed December 23, 1941, now abandoned.

What is claimed is:

1. An electric cell operative near —60° C. comprising a lead anode, a lead dioxide cathode, and an aqueous electrolyte containing about 41% perchloric acid.

2. A deferred activation cell-pack comprising a body of aqueous perchloric acid electrolyte, a cell container, a lead electrode and a lead dioxide electrode arranged for electrochemical association with the electrolyte body in said container, said electrolyte body containing a quantity of acid in excess of the stoichiometric equivalent of twice the lead of the electrode of smaller lead content and being isolated from said electrodes during deferment of activation of the cell, and being brought into electrochemical relation to said electrodes in said container to instantaneously activate the cell when it is desired to put the same in service.

3. A deferred activation cell-pack according to claim 2, in which the electrolyte contains approximately 40% by weight of HClO₄, rendering the cell suitable for operation at a temperature of approximately minus 50 degrees C.

4. A deferred activation cell-pack according to claim 2, in which said cell reservoir is provided with a capillary filling opening and is adapted to be filled by evacuation of said reservoir and immersion of said opening in said electrolyte charge followed by release of the vacuum.

5. A deferred activation battery-pack comprising a plurality of cells each according to claim 2, each cell reservoir having a capillary filling opening, said several filling openings terminating at one face of the battery, whereby on evacuation of the battery cells and immersion of said face in a pool comprising said isolated charges of electrolyte, application of positive pressure to the surface of the pool can effect simultaneous filling of all the battery cells and instantaneous activation of the battery for service.

6. A deferred activation battery-pack comprising a plurality of cells each according to claim 2, each cell container having a capillary filling opening of considerable axial length relative to its diameter, said several capillary openings terminating at one face of the battery, whereby on evacuation of the battery cells and immersion of said face in a pool comprising said bodies of electrolyte, application of positive pressure to the surface of the pool can effect simultaneous filling of all the battery cells and instantaneous activation of the battery for service, the attenuation of said capillary filling openings serving to limit discharge of the cells therethrough during the filling operation and until the external electrolyte paths between said capillary filling openings are broken.

7. A deferred activation electric cell comprising a lead electrode, a lead dioxide electrode, and an aqueous perchloric acid electrolyte, at least one of said electrodes being a limiting electrode and said cell having its output capacity determined by the quantity of active material available for dissolution from said limiting electrode, the electrolyte for said cell comprising a quantity of perchloric acid stoichiometrically equivalent to twice the lead content of said limiting electrode and also comprising a further quantity of perchloric acid at least several times as great as said stoichiometric quantity and which stabilizes the acidic character of the electrolyte and the voltage of the cell throughout the range of discharge of the cell.

8. A deferred activation cell comprising a quantity of aqueous perchloric acid electrolyte containing a minor proportion of dissolved lead perchlorate relative to its perchloric acid content, a cell container and a pair of electrode members therein, at least one of which is subject to attack by the electrolyte when exposed to the air, said members and said electrolyte being hermetically sealed in said container, whereby reaction between said electrodes and said acid electrolyte is avoided and said electrolyte is maintained in condition to deposit lead and lead dioxide on said electrodes during charging of the cell to activate it for service.

9. A deferred activation cell comprising an aqueous electrolyte containing in the uncharged condition of the cell a small proportion of lead perchlorate and a large proportion of perchloric acid relative to its lead perchlorate content, a service anode-support of a metal which does not replace hydrogen from the electrolyte, and a service cathode-support of a metal electrochemically inert in perchloric acid, whereby during charging lead is deposited on the anode-support and lead dioxide on the cathode-support, the electrolyte varying but little in its acid content during the charging and discharging of the cell.

10. A deferred activation cell according to claim 9 in which the anode-support is of copper and the electrolyte and the anode- and cathode-supports are hermetically sealed in the cell.

11. A deferred activation electric cell comprising a lead electrode, a lead dioxide electrode, and an aqueous electrolyte solution of an acid which neither oxidizes lead nor reduces lead dioxide by contact therewith and which forms on electrochemical reaction with lead and lead dioxide a salt soluble in such electrolyte solution, at least one of said electrodes being a limiting electrode and said cell having its output capacity determined by the quantity of active material available for dissolution from said limiting electrode, the electrolyte of said cell comprising a quantity of said acid stoichiometrically equivalent to twice the lead content of said limiting electrode and particularly characterized in that the electrolyte of the cell also comprises a further quantity of said acid at least several times as great as said stoichiometric quantity and which stabilizes the acidic character of the electrolyte and the voltage of the cell throughout the range of discharge of the cell.

12. A deferred activation cell according to claim 11, said lead anode initially enclosing, and initially isolating from contact with said acid electrolyte, an auxiliary voltage augmenting anode electrically connected in parallel with said lead anode and electro-chemically more active with said acid than lead, which voltage augmenting electrode becomes exposed to the acid electrolyte on electrochemical dissolution of said lead anode by said acid electrolyte.

13. A deferred activation battery-pack comprising a plurality of cells each according to claim 11, the electrolyte of said cells being isolated in a pool separate from said cells during deferment of activation of said battery, each cell reservoir having a capillary filling opening, said several filling openings terminating in a group at one face of the battery, whereby on evacuation of the battery cells and immersion of said group in said isolated pool of electrolyte, application of positive pressure to the surface of the pool can effect simultaneous filling of all the battery cells and instantaneous activation of the battery for service.

14. A method of rapidly filling a deferred activation battery, which battery comprises a plurality of cells, said method comprising providing said cells with individual capillary filling tips all projecting from one face of the battery, creating a vacuum in said cells, immersing the ends only of said capillary tips in a pool of electrolyte, applying positive pressure to said pool to transfer electrolyte therefrom through said individual tips into said cells, and removing said tips from the pool of electrolyte to break the short-circuiting paths created between said tips by said pool.

15. A method according to claim 14 further comprising the step of applying insulating wax between and over the projecting capillary tips of the filled cells after they have been removed from the pool of electrolyte.

16. A method of rapidly filling and instantaneously activating a deferred activation battery which has a plurality of capillary filling tips projecting from one of its faces and communicating respectively with cells having lead and lead-dioxide electrodes therein; said method comprising the steps of (a) providing a common electrolyte pool consisting essentially of an aqueous solution of an acid electrolyte, the volume of the pool being at least equal to to volume of the cells of the battery, (b) evacuating the battery of cells. (c) immersing the ends only of the capillary filling tips thereof in said common electrolyte pool, (d) then applying a positive pressure to the surface of the common pool to effect filling of the evacuated cells of the battery with the solution of electrolyte from the pool for instantaneously electro-chemically activating the cells of the battery, and (e) on completion of said filling removing the capillary filling tips from the common pool of electrolyte, thereby breaking the cell short circuiting paths through said capillary filling tips and said pool of electrolyte.

17. A method of rapidly filling a battery which has a plurality of capillary filling tips projecting from one of its faces and communicating respectively with cells having electrodes therein; said method comprising the steps of (a) providing a common electrolyte pool the volume of the pool being at least equal to the volume of the cells of the battery, (b) evacuating the battery of cells, (c) immersing the ends only of the capillary filling tips thereof in said common electrolyte pool, (d) then applying a positive pressure to the surface of the common pool to effect filling of the evacuated cells of the battery with the solution of electrolyte from the pool, and (e) on completion of said filling removing the capillary filling tips from the common pool of electrolyte, thereby breaking the cell short circuiting paths through said capillary filling tips and said pool of electrolyte.

References Cited in the file of this patent
UNITED STATES PATENTS

| Number | Name | Date |
|---|---|---|
| 592,722 | Bell | Oct. 26, 1897 |
| 759,065 | Betts | May 3, 1904 |
| 1,425,163 | Bardt | Aug. 8, 1922 |
| 1,953,591 | Creitz | Apr. 3, 1934 |
| 2,349,763 | Setzer | May 23, 1944 |
| 2,382,675 | Sutherland et al. | Aug. 14, 1945 |

OTHER REFERENCES

"A Lead Dioxide Cell Containing Various Electrolytes" by Schrodt et al., published in "The Electrochemical Society." Preprint 90–21 of a paper presented at October 1946 meeting held at Toronto, Canada. (Copy received in U.S. Patent Office Library Nov. 1, 1946.)

UNITED STATES PATENT OFFICE

CERTIFICATE OF CORRECTION

Patent No. 2,936,327                                   May 10, 1960

John P. Schrodt et al.

It is hereby certified that error appears in the printed specification of the above numbered patent requiring correction and that the said Letters Patent should read as corrected below.

Column 1, lines 70 and 71, for "Fig. 2 shows a further modified assembly of a mutual-reservoir unit removed;" read -- Fig. 2 is a view of the underside of Fig. 1, with the reservoir unit removed; --; column 2, line 33, for "inslulated" read -- insulated --; column 8, line 70, for "me" read -- he --; column 11, line 22, after "made" insert -- of any --.

Signed and sealed this 13th day of December 1960.

(SEAL)
Attest:

KARL H. AXLINE                                           ROBERT C. WATSON
Attesting Officer                                         Commissioner of Patents